(12) United States Patent
Ellenkamp-Van Olst et al.

(10) Patent No.: US 10,442,584 B2
(45) Date of Patent: Oct. 15, 2019

(54) DISPENSING CLOSURE WITH SELF-CLOSING VALVE

(71) Applicant: Weener Plastics Netherlands B.V., Tilburg (NL)

(72) Inventors: Lenny Marita Ellenkamp-Van Olst, Doetinchem (NL); Willem Ramon, Woerden (NL); Albertus Rap, Ede (NL); Gerrit Jan Stegeman, Laren (NL); Sebastiaan Wilhelmus Josephus Den Boer, Twello (NL)

(73) Assignee: Weener Plastics Netherlands B.V., Tilburg (NL)

( * ) Notice: Subject to any disclaimer, the term of this patent is extended or adjusted under 35 U.S.C. 154(b) by 0 days.

(21) Appl. No.: 15/546,296

(22) PCT Filed: Jan. 26, 2016

(86) PCT No.: PCT/NL2016/050060
§ 371 (c)(1),
(2) Date: Jul. 26, 2017

(87) PCT Pub. No.: WO2016/126156
PCT Pub. Date: Aug. 11, 2016

(65) Prior Publication Data
US 2018/0022514 A1    Jan. 25, 2018

(30) Foreign Application Priority Data
Feb. 3, 2015    (NL) ........................................ 2014225

(51) Int. Cl.
*B65D 47/20* (2006.01)
*B29C 65/08* (2006.01)
(Continued)

(52) U.S. Cl.
CPC .......... *B65D 47/2031* (2013.01); *B29C 65/08* (2013.01); *B29C 66/1122* (2013.01);
(Continued)

(58) Field of Classification Search
CPC ............ B65D 47/2031; B65D 47/0842; B29C 66/61; B29C 66/71; B29C 66/8322;
(Continued)

(56) References Cited

U.S. PATENT DOCUMENTS

| 1,989,714 A | 2/1935 | Statham |
| 3,445,042 A | 5/1969 | Elmore et al. |

(Continued)

FOREIGN PATENT DOCUMENTS

| DE | 830478 C | 2/1952 |
| FR | 2284533 A1 | 4/1976 |

OTHER PUBLICATIONS

Foil _ Definition of Foil by Merriam-Webster, Viewed on Dec. 25, 2018.*
(Continued)

*Primary Examiner* — Paul R Durand
*Assistant Examiner* — Randall A Gruby
(74) *Attorney, Agent, or Firm* — Hoffmann & Baron, LLP

(57) ABSTRACT

A dispensing closure for a product container includes a plastic closure body having a top wall with a dispensing opening which is arranged in line with a dispensing passage of the container. The closure includes a self-closing valve embodied as a membrane made of a plastic foil. The membrane has a valve portion, which in use can assume an open position under influence of product pressure, and an attachment portion surrounding the valve portion. The attachment portion of the valve is sealed to an annular support surface integrally formed in the closure body along the periphery of the opening or being formed on a plastic (Continued)

annular insert part that is connected to the closure body along the periphery of the opening. The seal between the attachment portion and the support surface includes an annular groove and an inner annular seal zone adjoining the annular groove on a radial inner side.

13 Claims, 1 Drawing Sheet

(51) Int. Cl.
  *B29C 65/00* (2006.01)
  *B29D 99/00* (2010.01)
  *B29L 31/56* (2006.01)
  *B65D 47/08* (2006.01)
(52) U.S. Cl.
  CPC ........ *B29C 66/472* (2013.01); *B29C 66/5346* (2013.01); *B29C 66/61* (2013.01); *B29C 66/73921* (2013.01); *B29C 66/81427* (2013.01); *B29C 66/8322* (2013.01); *B29D 99/0096* (2013.01); *B29C 66/71* (2013.01); *B29L 2031/56* (2013.01); *B65D 47/0842* (2013.01)
(58) Field of Classification Search
  CPC ........ B29C 66/73921; B29C 66/81427; B29C 66/1122; B29C 66/472; B29C 66/5346; B29C 65/08; B29D 99/0096; B29L 2031/56
  See application file for complete search history.

(56) References Cited

U.S. PATENT DOCUMENTS

| | | | |
|---|---|---|---|
| 4,969,965 A | 11/1990 | Matty et al. | |
| 5,680,969 A * | 10/1997 | Gross | B65D 47/2031 222/494 |
| 5,743,443 A | 4/1998 | Hins | |
| 5,897,033 A * | 4/1999 | Okawa | B65D 47/2031 222/212 |
| 5,927,567 A * | 7/1999 | Fillmore | B29C 43/146 222/490 |
| 5,944,234 A * | 8/1999 | Lampe | B65D 47/0804 222/490 |
| 6,045,004 A * | 4/2000 | Elliott | B65D 47/0804 222/494 |
| 6,089,411 A * | 7/2000 | Baudin | B65D 47/2031 222/212 |
| 6,095,381 A * | 8/2000 | Schwanenberg | B65D 47/2031 222/212 |
| 6,186,374 B1 * | 2/2001 | Gross | B65D 47/0838 222/494 |
| 6,213,355 B1 * | 4/2001 | Schwanenberg | B65D 47/2031 222/212 |
| 6,223,956 B1 * | 5/2001 | Albers | B65D 47/2031 137/493 |
| 6,230,940 B1 * | 5/2001 | Manning | B65D 47/2031 220/89.1 |
| 6,273,305 B1 * | 8/2001 | Fioravanti | B65D 47/2031 222/494 |
| 6,293,437 B1 * | 9/2001 | Socier | B65D 47/2031 222/212 |
| 6,367,668 B1 * | 4/2002 | Schwanenberg | B65D 47/2031 222/490 |
| 6,406,207 B1 * | 6/2002 | Wiegner | A46B 11/0027 401/272 |
| 6,543,652 B1 * | 4/2003 | Kelder | B65D 47/2037 222/212 |
| 6,616,016 B2 * | 9/2003 | Hicks | B65D 47/0847 222/212 |
| 6,672,479 B2 * | 1/2004 | Shiraishi | B65D 23/02 222/105 |
| 6,672,487 B1 * | 1/2004 | Lohrman | B65D 47/0804 222/1 |
| 6,726,063 B2 * | 4/2004 | Stull | B65D 47/2031 222/212 |
| 6,971,558 B2 * | 12/2005 | Ramsey | B65D 47/2031 222/212 |
| 7,128,245 B2 * | 10/2006 | Lee | B65D 47/0809 222/212 |
| 7,152,763 B2 * | 12/2006 | Stull | B29C 45/0081 222/212 |
| 7,255,250 B2 * | 8/2007 | Pugne | B65D 47/0804 215/327 |
| 7,503,469 B2 * | 3/2009 | Bloom | B65D 47/2031 222/212 |
| 7,628,297 B2 * | 12/2009 | Pugne | B65D 47/0804 215/237 |
| 7,980,430 B2 * | 7/2011 | Hickok | B65D 47/2031 222/490 |
| 8,100,276 B2 * | 1/2012 | Moor | A61J 9/005 215/11.1 |
| 8,397,956 B2 * | 3/2013 | Olechowski | B65D 47/2031 222/494 |
| 8,464,915 B2 * | 6/2013 | Rovelli | B65D 47/2031 220/203.01 |
| 8,608,034 B2 * | 12/2013 | Bloom | B65D 47/2031 220/212 |
| 8,662,104 B2 * | 3/2014 | Hansmann | A61M 16/20 137/493 |
| 8,733,600 B2 * | 5/2014 | Pritchard | B65D 47/103 222/494 |
| 8,960,502 B2 * | 2/2015 | Stehli, Jr. | B65D 83/0055 222/105 |
| 10,093,918 B2 * | 10/2018 | Mielke | C12N 15/1017 |
| 2002/0074091 A1 | 6/2002 | Faherty | |
| 2004/0251278 A1 * | 12/2004 | Arai | B65D 47/2031 222/212 |
| 2006/0049208 A1 * | 3/2006 | Daansen | B05B 11/007 222/212 |
| 2006/0249545 A1 * | 11/2006 | Ramsey | B65D 47/2031 222/494 |
| 2007/0295763 A1 * | 12/2007 | Brunner | B65D 41/0471 222/494 |
| 2007/0295765 A1 * | 12/2007 | Bull | B65D 47/2031 222/494 |
| 2008/0264979 A1 * | 10/2008 | Nijland | B65D 47/2031 222/494 |
| 2009/0050648 A1 * | 2/2009 | Wisniewski | B65D 47/2031 222/83 |
| 2009/0283555 A1 * | 11/2009 | Maxwell | B65D 1/32 222/494 |
| 2012/0128403 A1 * | 5/2012 | Koelsche | A45D 34/042 401/206 |
| 2014/0319135 A1 * | 10/2014 | Fox | B29D 99/0096 220/202 |
| 2015/0014369 A1 | 1/2015 | Hatton et al. | |
| 2016/0001936 A1 * | 1/2016 | Rap | B65D 43/16 222/490 |
| 2016/0167864 A1 * | 6/2016 | De Cleir | B65D 1/04 206/221 |
| 2017/0183134 A1 * | 6/2017 | Bull | B65D 47/2031 |

OTHER PUBLICATIONS

Office Action for corresponding EP Application No. 16710025.4, dated Jun. 22, 2018 (4 pages).

* cited by examiner

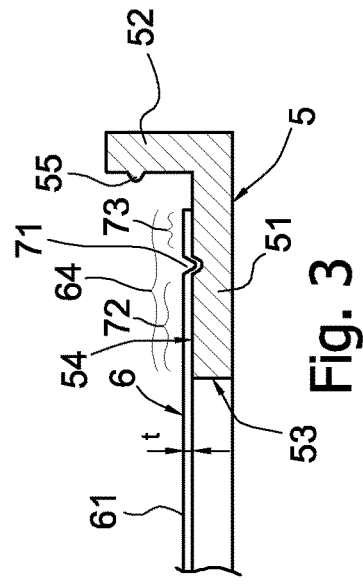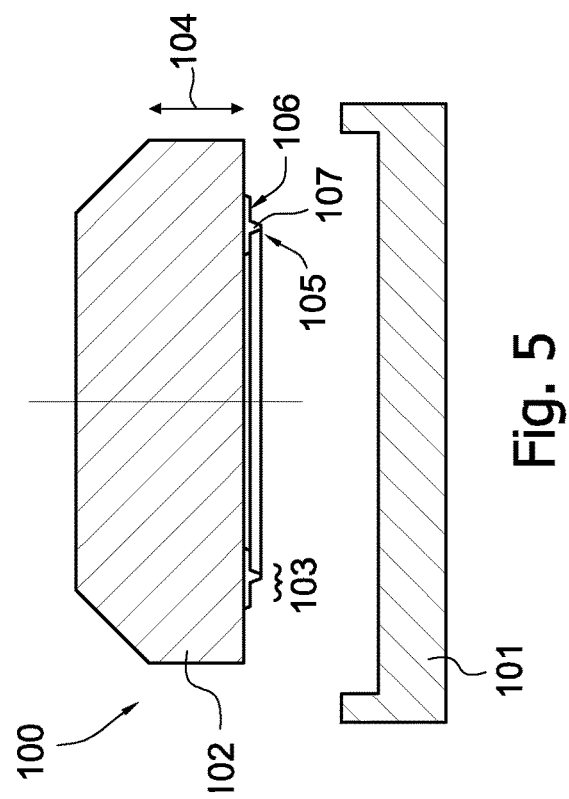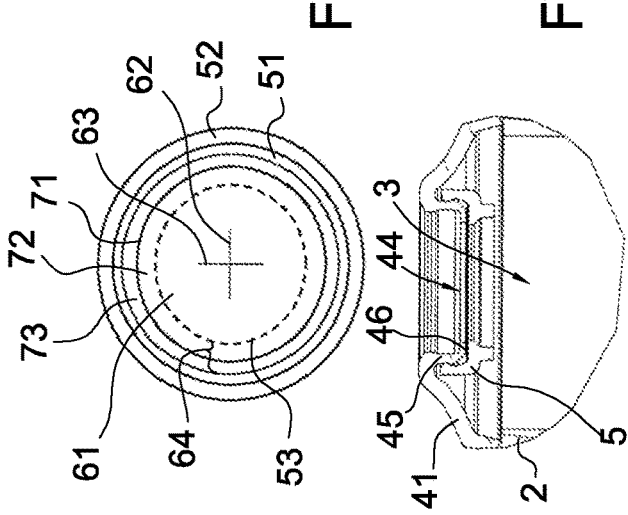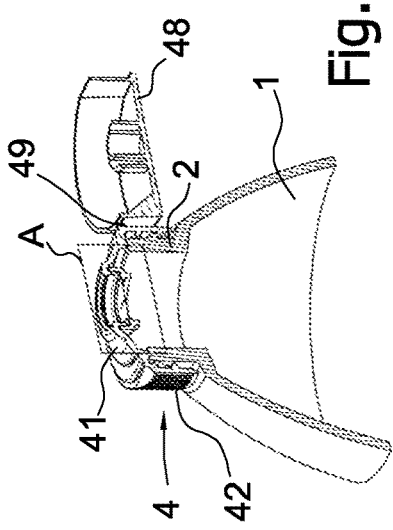

DISPENSING CLOSURE WITH SELF-CLOSING VALVE

CROSS-REFERENCE TO RELATED APPLICATIONS

This application is the National Stage of International Application No. PCT/NL2016/050060 filed Jan. 26, 2016, which claims the benefit of Netherlands Application No. NL 2014225, filed Feb. 3, 2015, the contents of which is incorporated by reference herein.

FIELD OF THE INVENTION

The present invention relates to a dispensing closure comprising a plastic closure body adapted to be attached to a product container having a dispensing passage for dispensing product from the container. The closure body has a top wall provided with a dispensing opening which is arranged in line with the dispensing passage of the container. The closure furthermore comprises a self-closing valve for closing the opening in the top wall.

BACKGROUND OF THE INVENTION

Containers such as squeeze bottles and tubes are typically provided with dispensing closures as mentioned above to enable controlled dispensing of the contents of the container.

In known closures the self-closing valve is typically clamped in the closure cap adjacent the dispensing opening. Many types of self-closing valves are known. A disc type valve typically consists of a disc of rubber material, such as disclosed in U.S. Pat. Nos. 1,989,714 and 3,445,042, provided with a central valve area having one or more slits. The disc type valve is positioned in the closure body adjacent the dispensing opening in the top wall, and is fixed in position using an insert in the form of a clamping ring. After the valve has been placed in the closure body, it is fixed in its position by placing clamping ring over the valve. Often the clamping ring is placed in a sequential production step. Lately, plain disc type valves have been replaced by injection molded valves of a more complicated design and shape. These types of valves often made of silicone rubber are for example disclosed in WO2008/074517 and U.S. Pat. No. 5,743,443. The injection molded valves are complicated in design and the injection molding process makes these kinds of valves rather expensive.

SUMMARY OF THE INVENTION

The invention has for an object to provide an alternative dispensing closure.

This object is achieved by a dispensing closure comprising a plastic closure body adapted to be attached to a product container having a dispensing passage for dispensing product from the container, the closure body having a top wall provided with an opening which is arranged in line with the dispensing passage of the container, the closure furthermore comprising a self-closing valve embodied as a membrane made of a plastic foil having a thickness t, which membrane has a valve portion (with one or more slits or holes), which in use can assume an open position under influence of product pressure, and an attachment portion surrounding the valve portion, the attachment portion of the valve is sealed to an annular support surface integrally formed in the closure body along the periphery of the opening or being formed on a plastic annular insert part that is connected to the closure body along the periphery of the opening, wherein the seal between the attachment portion and the support surface comprises an annular groove and an inner annular seal zone adjoining the annular groove on a radial inner side, said annular groove being recessed in the support surface and having a depth that is 2-5 times the thickness of the membrane.

By providing a seal between the attachment zone of the membrane and the annular support surface, that comprises a groove and an inner annular seal zone, the fixation of the membrane to the support surface is such that a good functioning valve without bulging or wrinkling of the valve portion can be assured.

Sealing the attachment portion of the valve against the annular support surface is preferably done by means of a sealing tool which has an annular elevation having a flat top surface and an annular rib protruding from said flat top surface, said flat top surface and annular rib portion defining the sealing energy emitting surface, wherein said energy emitting surface engages the sealing portion of the valve and emit energy to said sealing portion and to said support surface to seal them together.

By pressing the flat top surface of the annular elevation against the annular support surface, the annular rib on the flat top surface is pressed into the material of the initially flat annular support surface. Consequently also an annular portion of the membrane is pressed into the initially flat annular support surface. Thereby the membrane is radially slightly stretched. While the annular rib is pressed into the material of the annular support surface, said material on the radial inner and outer side of the groove formed by the rib has the tendency to bulge out with respect to the initially flat support surface. Therefor the flat top surface of the sealing tool is located at least radially inward of the annular rib, whereby the annular support surface is pressed flat on an inner side of the groove. When energy is emitted through the flat top surface and the annular rib, the membrane is sealed and fixed to the annular support surface in the groove and on the inner annular seal zone after the membrane is smoothed out and the inner annular seal zone is pressed flat.

In a preferred embodiment of the dispensing closure according to the invention, the seal between the attachment portion and the support surface furthermore comprises an outer annular seal zone adjoining the annular groove on a radial outer side.

In accordance with this, the flat top surface of the sealing tool is also located radially outward of the annular rib, whereby the annular support surface is pressed flat on the radial outer side of the groove. By providing not only an inner annular seal zone, but also an outer annular seal zone, it can be guaranteed that when for instance a plastic annular insert part is used, the combination of insert part and membrane is flat, which is advantageous with respect of fixedly attach the insert in the closure.

In a preferred embodiment of the closure according to the invention, the inner annular seal zone and/or outer annular seal zone are/is flat.

In an alternative embodiment of the closure according to the invention, the inner annular seal zone and/or outer annular seal zone are/is conical. Also in this embodiment the membrane is not allowed to bulge or wrinkle and a smooth attachment area is assured.

In a possible further embodiment of the closure the inner annular seal zone and outer annular seal zone have a same radial width.

The insert part that may be applied in the closure according to the invention is advantageously made of a polymer material. A preferred material to be used for the insert part is polypropylene (PP). Also polyethylene (PE) is suitable for manufacturing such an insert part.

In a possible embodiment the insert part includes a circumferential wall portion that extends from the support surface of the annular insert part in the axial direction of the annular insert part and is located radially outward from the support surface. The circumferential wall portion provides the advantage that the attachment portion of the valve is protected. This is for example advantageous if annular insert parts provided with self-closing valves as described in the above, are collected in a box or other collection container and are transported to an assembly line where they are inserted in the closure. The valve of the annular insert part, and in particular the seal between its attachment zone and the support surface of the annular insert part, cannot be reached and thus damaged by other insert parts in the box. With little risk of damage a better consistency of the quality of insert part with self-closing valves can be achieved.

The plastic foil that is used for the membrane is preferably selected from PP foil, PE foil, or TPE foil.

The plastic foil may have a thickness within a range of 30-150 μm. The thickness of the foil depends on the specific material of which the foil is made.

In a possible embodiment the valve portion of the valve is provided with at least two intersecting slits.

In a possible embodiment the groove has a radial width within a range of 0.3-0.4 mm.

It was found that a particularly suitable foil in the dispensing closures according to the invention would be a PP foil having a thickness of approximately 50 μm. It is noted however that foils of other materials and thicknesses, can be suitable just as well.

It was found that with such a PP foil a groove with a depth of 0.15 mm functions well.

The inner annular seal zone has preferably a radial width of about 0.5 mm.

The outer annular seal zone preferably has a radial width of about 0.5 mm.

In the closure according to the invention and the typical dimensions of containers these closures are used with, the annular groove preferably has a diameter of about 10 mm.

The invention also relates to a device for attaching a foil type valve to a plastic closure body, or to a plastic insert part to be mounted in a closure body, to obtain a closure body according to any embodiments of the present invention, the device comprising:
 a nest for positioning and supporting the closure body or insert part, preferably with the support surface facing upwards;
 a sealing tool comprising a sealing energy emitting surface configured to engage the sealing portion of the valve and emit energy to said sealing portion and to said support surface to seal them together,
 said sealing tool being movably supported such that it can be moved towards and away from the support surface of the closure body or insert part that is positioned and supported in the nest,
 said sealing tool having an annular elevation having a flat top surface and an annular rib protruding from said flat top surface, said flat top surface and annular rib portion defining the sealing energy emitting surface.

In a possible embodiment of the device the sealing tool is a sonotrode adapted to attach the valve and support surface to each other by ultrasonic welding, wherein vibration is emitted through the sealing energy emitting surface to the sealing portion and support surface.

In another possible embodiment of the device the sealing tool is a heat sealing tool adapted to heat seal the valve and support surface to each other, wherein heat is emitted through the sealing energy emitting surface to the sealing portion and support surface.

The invention also relates to a method for manufacturing a dispensing closure comprising a plastic closure body adapted to be attached to a product container having a dispensing passage for dispensing product from the container, the method comprising the following steps:
 injection moulding the closure body having such that it has a top wall provided with an opening which is arranged in line with the dispensing passage of the container, and has an annular support surface integrally formed along the periphery of the opening,
 cutting a self-closing valve embodied as a membrane out of a plastic foil having a thickness t, such that the membrane has a valve portion, which in use can assume an open position under influence of product pressure, and has an attachment portion surrounding the valve portion,
 positioning the attachment portion of the valve against the annular support surface,
 sealing the attachment portion of the valve against the annular support surface by means of a sealing tool said sealing tool having an annular elevation having a flat top surface and an annular rib protruding from said flat top surface, said flat top surface and annular rib portion defining the sealing energy emitting surface, wherein said energy emitting surface engages the sealing portion of the valve and emit energy to said sealing portion and to said support surface to seal them together.

The invention also relates to a dispensing closure comprising a plastic closure body adapted to be attached to a product container having a dispensing passage for dispensing product from the container,
 the closure body having a top wall provided with an opening which is arranged in line with the dispensing passage of the container,
 the closure furthermore comprising a self-closing valve embodied as a membrane made of a plastic foil having a thickness t, which membrane has a valve portion (with one or more holes or slits), which in use can assume an open position under influence of product pressure, and an attachment portion surrounding the valve portion,
 the attachment portion of the valve is sealed to an annular support surface being formed on a plastic annular insert part that is connected to the closure body along the periphery of the opening,
 wherein the annular insert part includes a circumferential wall portion that extends from the support surface in the axial direction of the annular insert part and is located radially outward from the support surface.

BRIEF DESCRIPTION OF THE DRAWINGS

The invention will be elucidated in the following description with reference to the drawings, in which:

FIG. 1 shows an exploded view in perspective of a container provided with an embodiment of a dispensing closure according to the invention, FIG. 2 shows in detail the cross sectional view in the rectangle A in FIG. 1, FIG. 3 shows in more detail a cross section of an insert part of the dispensing closure of FIG. 1, FIG. 4 shows a top elevational view of the insert part with a self-closing valve of the dispensing closure of FIG. 1, and FIG. 5 shows schematically a cross section of a device for attaching a foil type valve to a plastic support surface.

DETAILED DESCRIPTION OF THE INVENTION

In FIG. 1 is shown a container 1 which has a neck portion 2 to which is attached a closure body 4 of a dispensing closure. The neck portion 2 of the container defines a dispensing passage 3. The closure body 4 comprises a top wall 41 and a peripheral skirt 42.

In the specific embodiment shown in FIG. 1, the closure body 4 has a lid 48 integrally and pivotably connected to it by a hinge 49.

FIG. 2 shows in more detail the dispensing closure on the container at the location of the dispensing passage 3. The top wall 41 of the closure body 4 is provided with a dispensing opening 44. In the specific embodiment shown the top wall 41 is provided with an inwardly extending collar 45 such that the opening 44 lies recessed with respect with the top wall 41. An inwardly extending annular flange 46 at the lower end of the collar 45 defines the dispensing opening 44.

At a lower side of the annular flange 46 and the collar 45 an annular insert part 5 is arranged. The insert part 5 is made of a polymer material, preferably PP or PE, although other polymer materials are also conceivable.

The annular insert part provided with a self-closing valve 6 is shown in more detail in FIGS. 3 and 4. The annular insert part 5 is essentially a flat plastic ring 51 with an inner edge 53 and an upstanding circumferential wall 52 at its radial outer edge. On the side of the ring 51 that faces the top wall 41 of the closure body 4 the self-closing valve 6 is arranged. The insert part is connected to the closure body 4 along the periphery of the opening by means of a snap connection between the radial inner side of the upstanding peripheral wall 52 and the radial outer side of the collar 45. In FIG. 3 an annular snap protrusion 55 is shown that engages with a snap feature of the collar 45.

The self-closing valve 6 is embodied as a membrane made of a plastic foil having a thickness t, which membrane has a valve portion 61, which is provided with intersecting slits 62, 63. The valve portion 61 can assume an open position under influence of product pressure. The membrane has an attachment portion 64 surrounding the valve portion 61.

The plastic foil of which the membrane is made may for example be a PP foil, a PE foil, or a TPE foil.

The attachment portion 64 of the valve 6 is sealed to an annular support surface 54 formed on the flat ring part 51 of the of the plastic annular insert part 5.

In the particular embodiment shown in the figures the seal between the attachment portion 64 and the support surface 54 comprises an annular groove 71, an inner annular seal zone 72 adjoining the annular groove 71 on a radial inner side thereof, and an outer annular seal zone 73 adjoining the annular groove 71 on a radial outer side thereof.

The annular groove 71 is recessed in the support surface 54 (cf. FIG. 3) and has a depth that is 2-5 times the thickness t of the membrane. A groove depth in this range (2t–5t) assures that the membrane is stretched sufficiently such that it is smooth, but is not stretched too much. The groove depth depends in practise on the specific material of which the plastic foil is made.

In the embodiment shown the inner annular seal zone 72 and the outer annular seal zone 73 are flat. It is however also conceivable that the inner and/or outer annular seal zone 72, 72 are conical, i.e. they lie recessed with respect to the support surface 54 with a slight inclination towards the groove 71.

In FIG. 3 is illustrated that the outer annular seal zone 73 has a width that is smaller than the inner annular seal zone 72. It is however also possible that the outer annular seal zone 73 has a larger width than the inner annular seal zone 72. Preferably, the outer annular seal zone 73 and inner annular seal zone 72 have the same radial width.

The thickness t of the plastic foil may be in a range of 30-150 µm, depending from the material the foil is made of. Just as an indication: If a PP-foil is used to manufacture the membrane thickness t of the foil is preferably about 50 µm. If a PE foil is used a suitable foil thickness could be about 110 µm. A TPE foil has a thickness that exceeds 100 µm.

In a practical embodiment the membrane is made of a PP the radial width of the outer annular seal zone 73 and inner annular seal zone can for example be about 0.5 mm. In such a practical embodiment the groove 71 may for example have a diameter of about 10 mm and a radial width within a range of 0.3-0.4 mm and a depth of about 0.15 mm. It is noted here that the combination of dimensions specifically mentioned here, although practically feasible, are meant to be indicative for the dimensions of the different parts. The mentioned dimensions should not be considered as limiting. It depends on the specific materials used, what dimensions are necessary to achieve a well working valve which is well fixed to the support surface. As skilled person will be able to establish what dimensions are to be used in a specific embodiment.

In FIG. 5 is shown a device 100 for attaching a foil type valve 6 to a plastic insert part 5 to be mounted in a closure body 4, as is described in the above.

The device comprises a nest 101 for positioning and supporting the insert part 5, preferably with the support surface 54 facing upwards.

The device 100 furthermore comprises a sealing tool 102. The sealing tool 102 has a sealing energy emitting surface 103 configured to engage the sealing portion 64 of the valve 6 and emit energy to said sealing portion 64 and to said support surface 54 to seal them together.

The sealing tool 102 is movably supported such that it can be moved towards and away from the insert part 5 that is positioned and supported in the nest 101, as is illustrated by the double arrow indicated with reference numeral 104.

The sealing tool 102 has an annular elevation 105 having a flat top surface 106 and an annular rib 107 that protrudes from the flat top surface 106. The flat top surface 106 and annular rib portion 107 define the sealing energy emitting surface 103. The annular rib 107 forms the groove 71 and the flat top surface portions on the radial inner and outer side of the annular rib 107 form the inner and outer seal zones 72, 73.

The height of the annular rib 107 with respect to the flat top surface 106 determines the depth of the groove 71 which may be 2-5 times the thickness t of the membrane. A height of the annular rib corresponding to a groove depth in this range (2t–5t) assures that the mounted membrane is flush. If the height of the rib 107 would be too high and thus the groove would become too deep, the displacement of material of the support surface 54 could be too great for the flat top surface 106 to smooth away. Thereby bulges could remain adjacent the groove, which can cause wrinkling and bulging of the membrane.

Preferably, the sealing tool 102 is a sonotrode adapted to attach the valve 6 and support surface 54 to each other by ultrasonic welding. Vibration energy is emitted through the sealing energy emitting surface 103 to the sealing portion 64 and support surface 54 whereby the seal 71, 72, 73 is made.

In another possible embodiment the sealing tool 102 is a heat sealing tool adapted to heat seal the valve 6 and support surface 54 to each other. In such an embodiment heat is emitted through the sealing energy emitting surface 103 to the sealing portion 64 of the valve 6 and the support surface 54.

In the above it is described that the foil type valve 6 is sealed to a support surface of an insert part 5 that is arranged in a closure body 4 and attached thereto by means of for example a snap connection, as is shown. It is noted however that also an embodiment is possible, wherein the insert part is omitted, and wherein a support surface as described in the above in connection with the insert part, is integrally formed in the closure body 4, for example on the flange 46. In such an embodiment the attachment portion 64 of the valve 6 is sealed to the support surface which is an integral part of the closure body.

The invention claimed is:

1. A dispensing closure comprising a plastic closure body adapted to be attached to a product container having a dispensing passage for dispensing product from the container,
    the closure body having a top wall provided with an opening which is arranged in line with the dispensing passage of the container,
    the dispensing closure furthermore comprising a self-closing valve embodied as a membrane made of a plastic having a thickness, which membrane has a valve portion with one or more slits or holes, which in use can assume an open position under influence of product pressure, and an attachment portion surrounding the valve portion,
    the attachment portion of the valve is heat sealed to an annular support surface formed on a plastic annular insert part that is connected to the closure body along a periphery of the opening,
    wherein the seal between the attachment portion and the support surface comprises an annular groove and an inner annular seal zone adjoining the annular groove on a radial inner side of the annular groove, said inner annular seal zone and said annular groove both formed in said support surface, wherein said annular groove being recessed in the support surface and having a depth that is 2 to 5 times the thickness of the membrane.

2. The dispensing closure according to claim 1, wherein the seal between the attachment portion and the support surface furthermore comprises an outer annular seal zone adjoining the annular groove on a radial outer side.

3. The dispensing closure according to claim 2, wherein the inner annular seal zone and outer annular seal zone have a same radial width.

4. The dispensing closure according to claim 2, wherein the outer annular seal zone has a radial width of about 0.5 mm.

5. The dispensing closure according to claim 1, wherein the inner annular seal zone and/or outer annular seal zone are/is flat.

6. The dispensing closure according to claim 1, wherein the insert part is made of a polymer material, preferably PP or PE.

7. The dispensing closure according to claim 1, wherein the insert part includes a circumferential wall portion that extends from the support surface of the ring in an axial direction of the ring and is located radially outward from the support surface.

8. The dispensing closure according to claim 1, wherein the plastic membrane is selected from PP foil, PE foil, or TPE foil.

9. The dispensing closure according to claim 1, wherein the plastic membrane has a thickness within a range of 30 to 150 µm.

10. The dispensing closure according to claim 1, wherein the valve portion of the valve is provided with at least two intersecting slits.

11. The dispensing closure according to claim 1, wherein the groove has a radial width within a range of 0.3 to 0.4 mm.

12. The dispensing closure according to claim 1, wherein the groove has a depth of 0.15 mm.

13. The dispensing closure according to claim 1, wherein the inner annular seal zone has a radial width of about 0.5 mm.

* * * * *